United States Patent
Park et al.

(10) Patent No.: US 10,516,459 B2
(45) Date of Patent: Dec. 24, 2019

(54) METHOD FOR TRANSMITTING AND RECEIVING CHANNEL STATE INFORMATION (CSI) IN WIRELESS COMMUNICATION SYSTEM, AND APPARATUS THEREFOR

(71) Applicant: LG ELECTRONICS INC., Seoul (KR)

(72) Inventors: Haewook Park, Seoul (KR); Kijun Kim, Seoul (KR); Hyungtae Kim, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,161

(22) PCT Filed: Sep. 13, 2016

(86) PCT No.: PCT/KR2016/010331
§ 371 (c)(1),
(2) Date: Mar. 14, 2018

(87) PCT Pub. No.: WO2017/048048
PCT Pub. Date: Mar. 23, 2017

(65) Prior Publication Data
US 2018/0254814 A1 Sep. 6, 2018

Related U.S. Application Data

(60) Provisional application No. 62/218,555, filed on Sep. 14, 2015, provisional application No. 62/264,817, filed on Dec. 8, 2015.

(51) Int. Cl.
*H04B 7/04* (2017.01)
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0478* (2013.01);
(Continued)

(58) Field of Classification Search
CPC .. H04B 7/0626; H04B 7/0636; H04B 7/0478; H04B 7/0456; H04B 7/0669; H04B 7/0628
See application file for complete search history.

(56) References Cited

U.S. PATENT DOCUMENTS

2011/0142147 A1   6/2011  Chen et al.
2012/0113830 A1*  5/2012  Zhu .................. H04B 7/024
                                                       370/252
(Continued)

OTHER PUBLICATIONS

Alcatel-Lucent et al., "Discussion on Downlink Multiuser Superposition Schemes and Designs", R1-153820, 3GPP TSG RAN WG1 Meeting #82, Beijing, China, Aug. 24-28, 2015, see sections 3.1-3.3.

*Primary Examiner* — Dac V Ha
(74) *Attorney, Agent, or Firm* — Dentons US LLP

(57) ABSTRACT

A method for transmitting and receiving channel state information (CSI) in a wireless communication system, and an apparatus therefor are disclosed. Specifically, a method for a terminal transmitting CSI in a wireless communication system supporting multi-user superposition transmission (MUST) may comprise the steps of: reporting to a base station a first precoding matrix indicator (PMI) indicating a precoding matrix that is the most preferred by the terminal, and a first channel quality indicator (CQI) that is calculated assuming use of the first PMI; and reporting to the base station a second PMI indicating a precoding matrix that is secondly preferred by the terminal, and a second CQI that is calculated assuming use of the second PMI.

16 Claims, 10 Drawing Sheets

(52) U.S. Cl.
CPC ......... *H04B 7/0636* (2013.01); *H04B 7/0628* (2013.01); *H04B 7/0669* (2013.01)

(56) References Cited

U.S. PATENT DOCUMENTS

| | | |
|---|---|---|
| 2012/0270535 A1 | 10/2012 | Chen et al. |
| 2013/0122953 A1 | 5/2013 | Zhang et al. |
| 2013/0336416 A1* | 12/2013 | Sivanesan ............ H04B 7/0417 375/267 |
| 2014/0072068 A1* | 3/2014 | Zhu ........................ H04B 7/024 375/267 |
| 2014/0079146 A1* | 3/2014 | Kim ..................... H04B 7/0417 375/260 |
| 2014/0226746 A1 | 8/2014 | Ko et al. |
| 2014/0247860 A1* | 9/2014 | Zhu ........................ H04W 36/14 375/219 |
| 2014/0254701 A1* | 9/2014 | Geirhofer ............ H04B 7/0626 375/267 |
| 2018/0123669 A1* | 5/2018 | Xi ............................ H04B 7/04 |
| 2018/0220399 A1* | 8/2018 | Davydov .............. H04L 1/0026 |

\* cited by examiner

[FIG. 1]
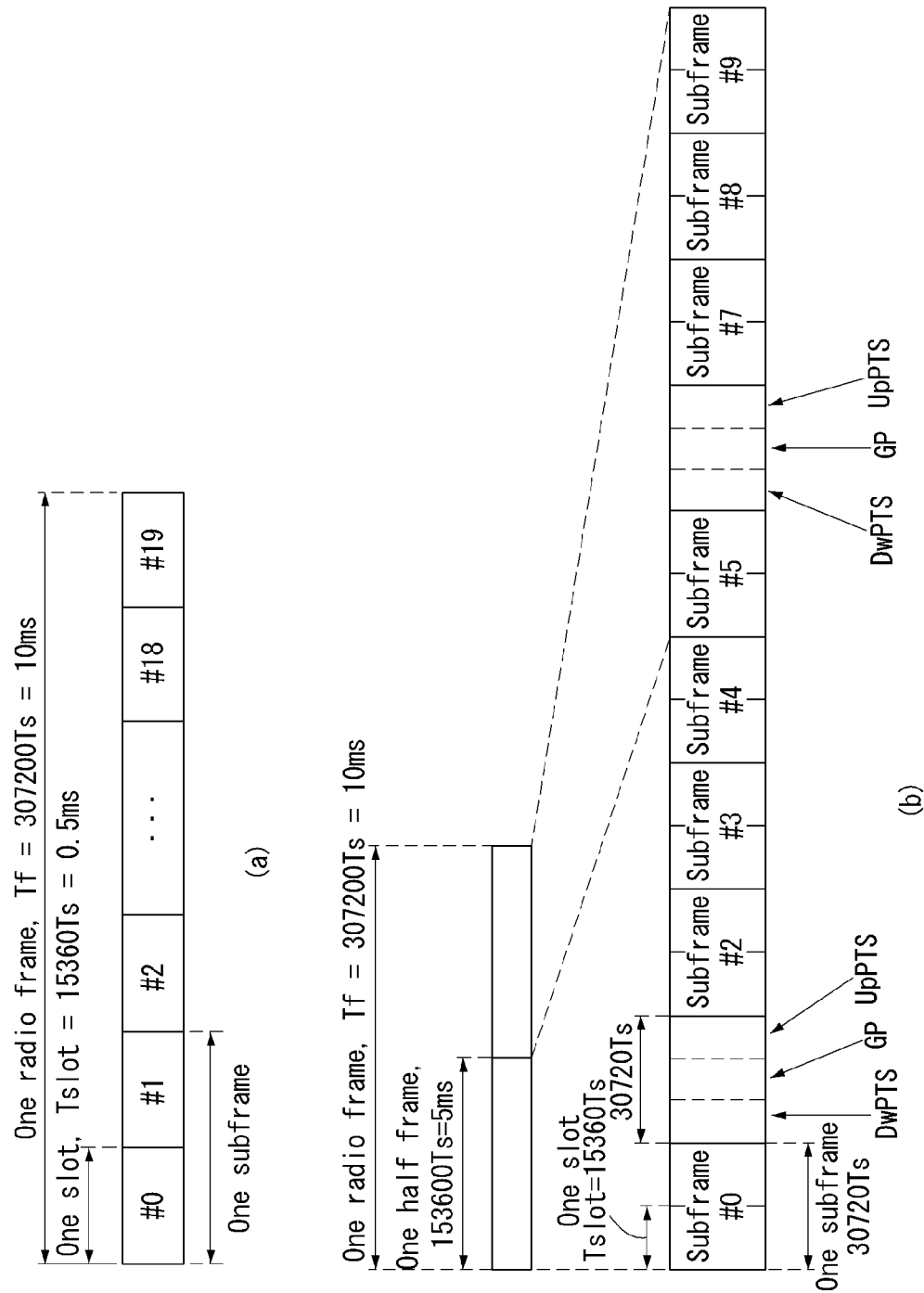

【FIG. 2】
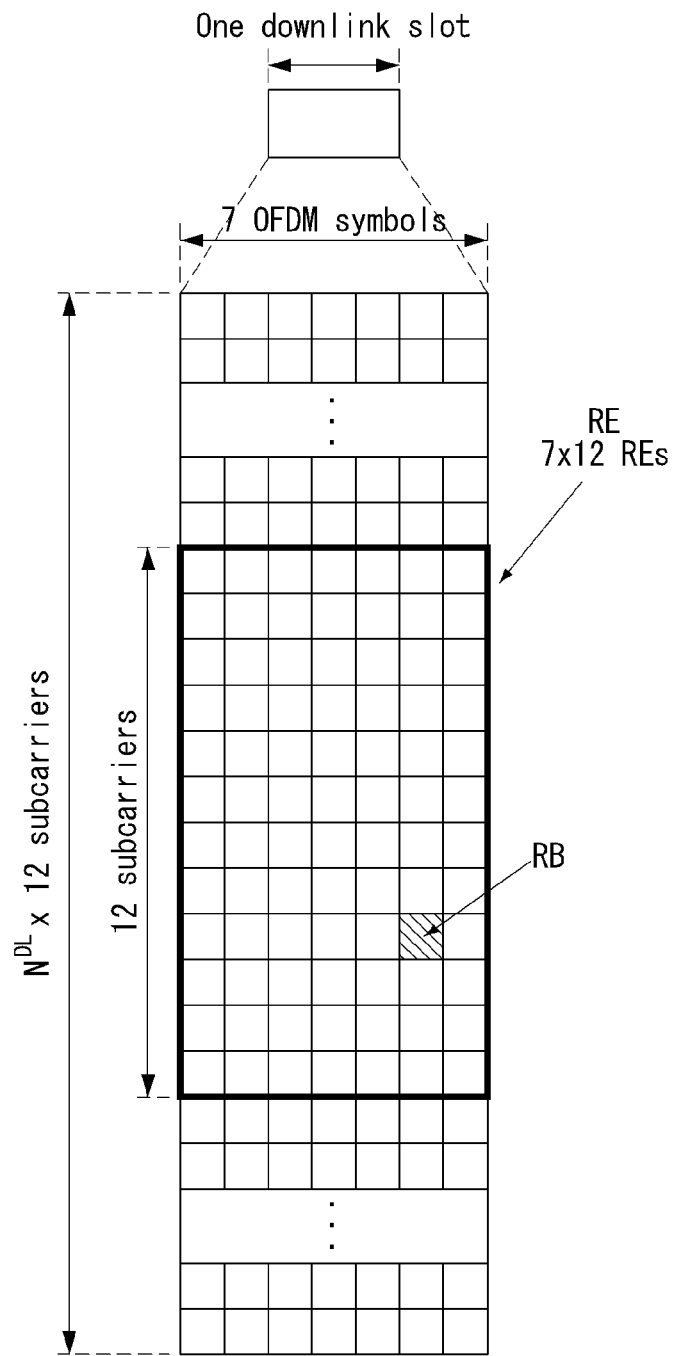

[FIG. 3]
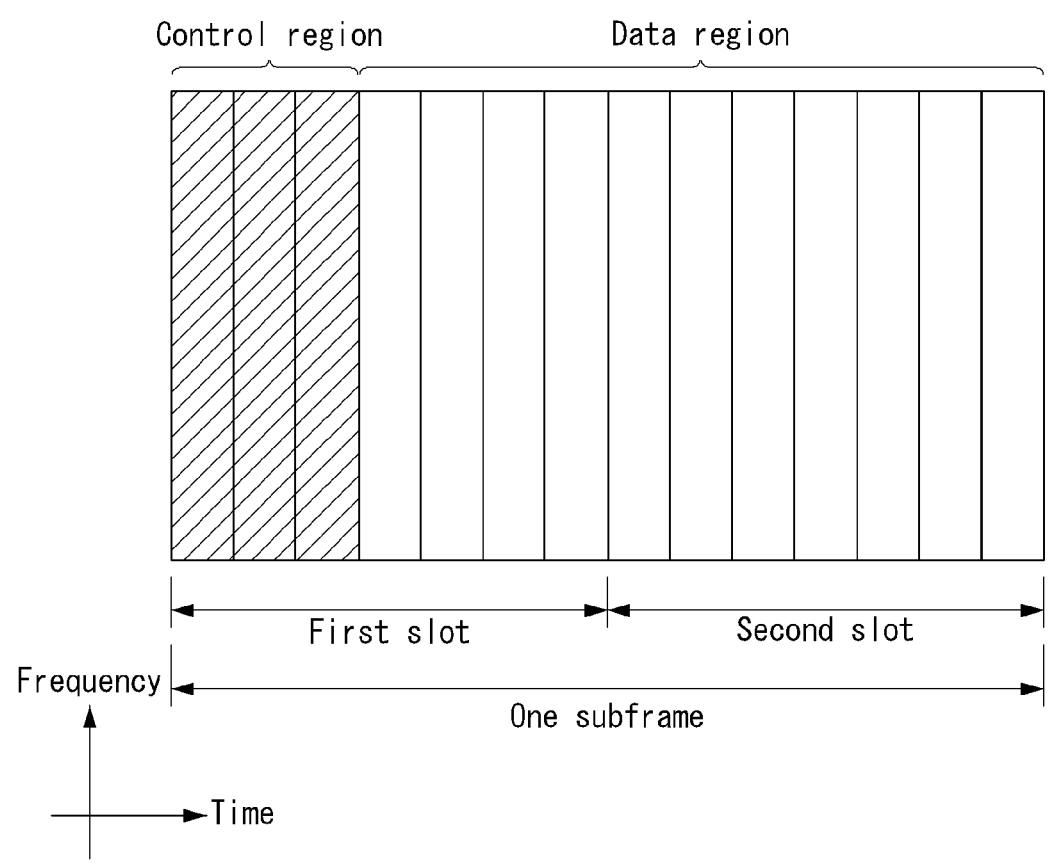

[FIG. 4]
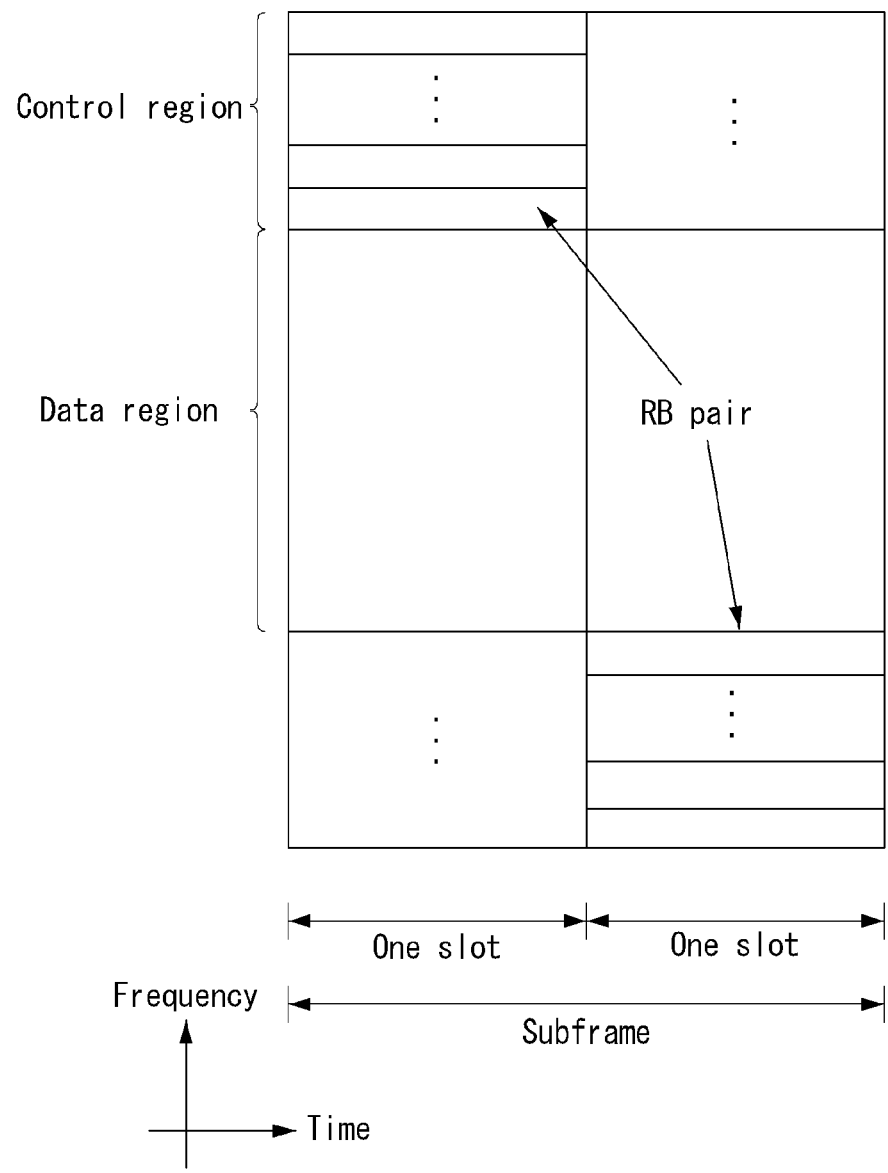

[FIG. 5]
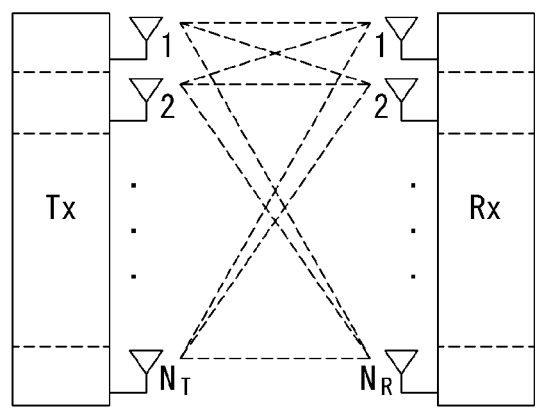
[FIG. 6]
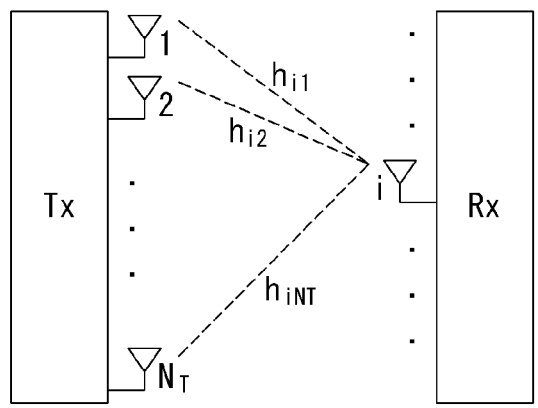

[FIG. 7]
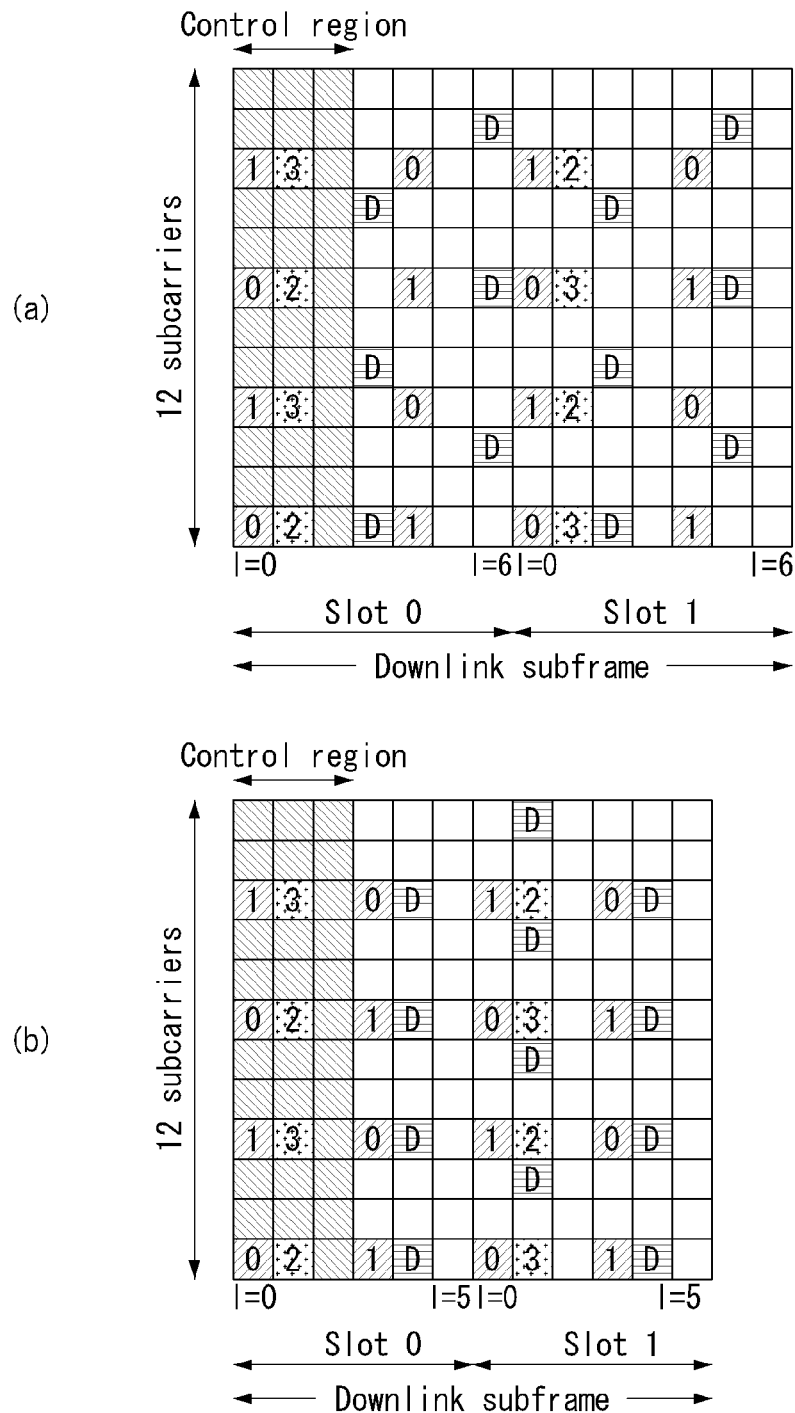

[FIG. 8]
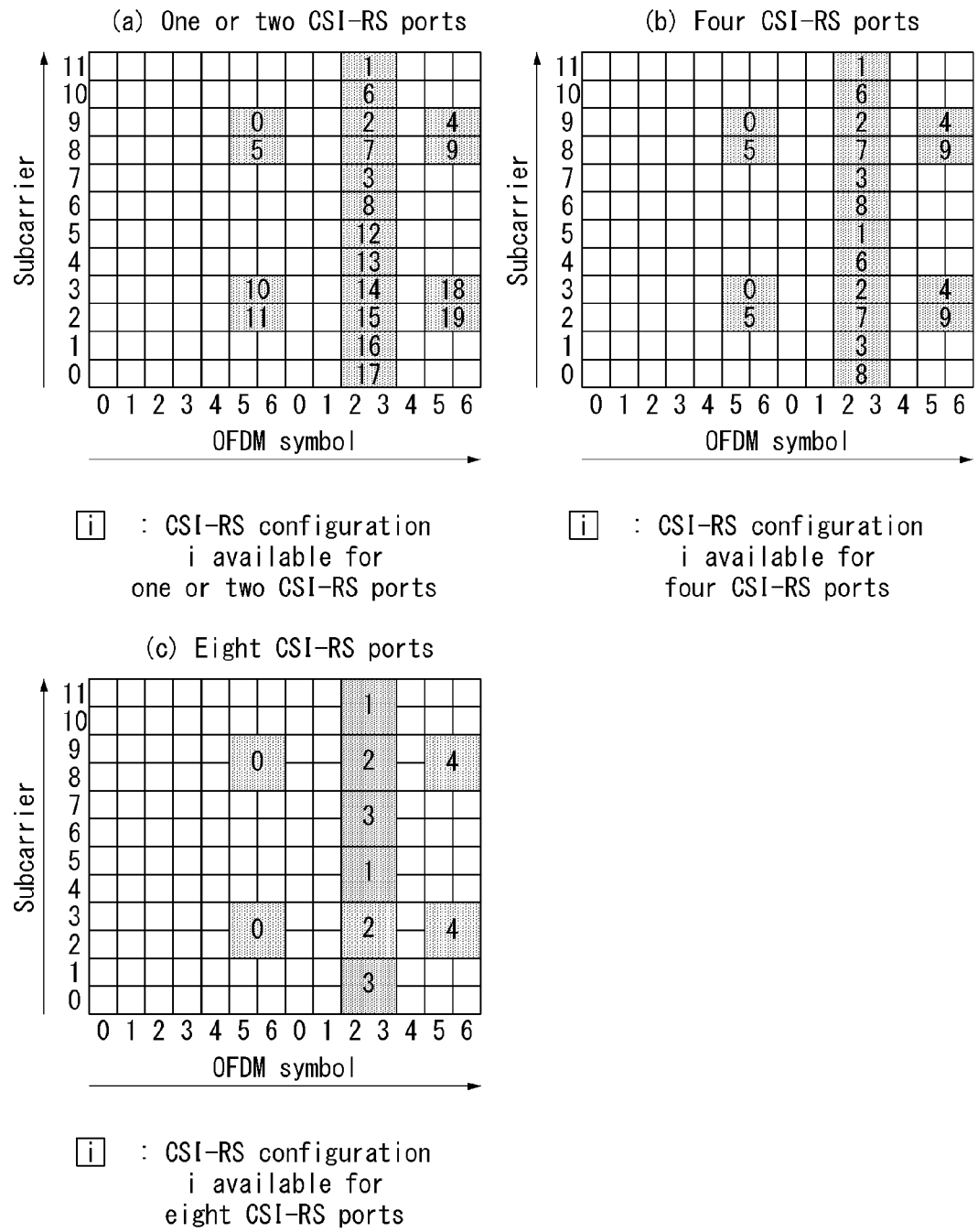

【FIG. 9】
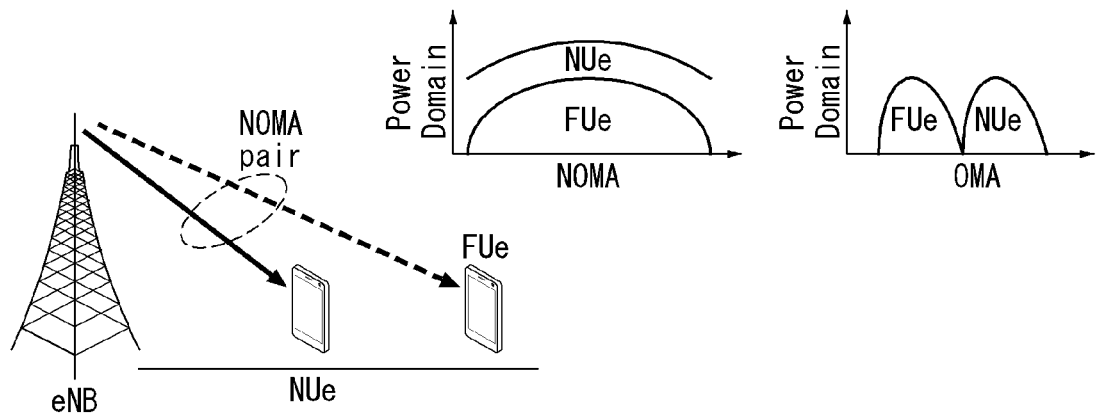
【FIG. 10】
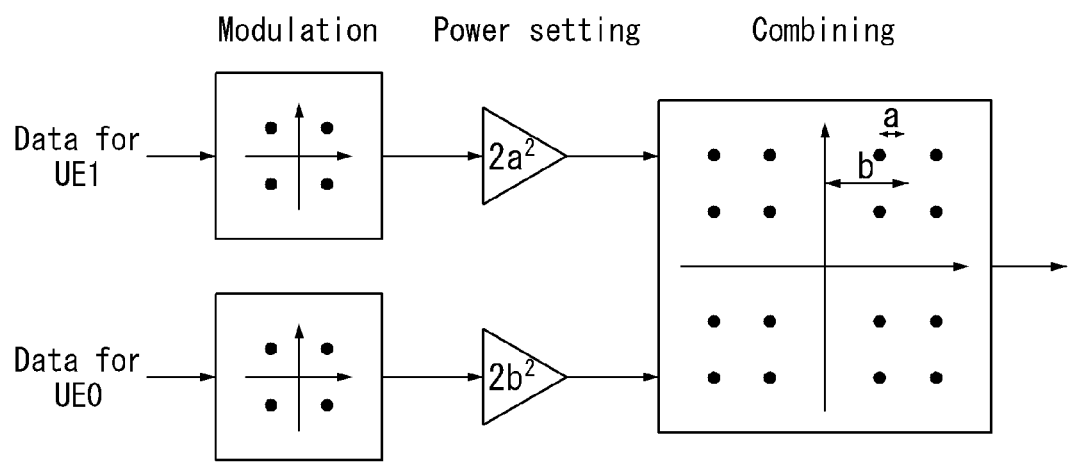

[FIG. 11]
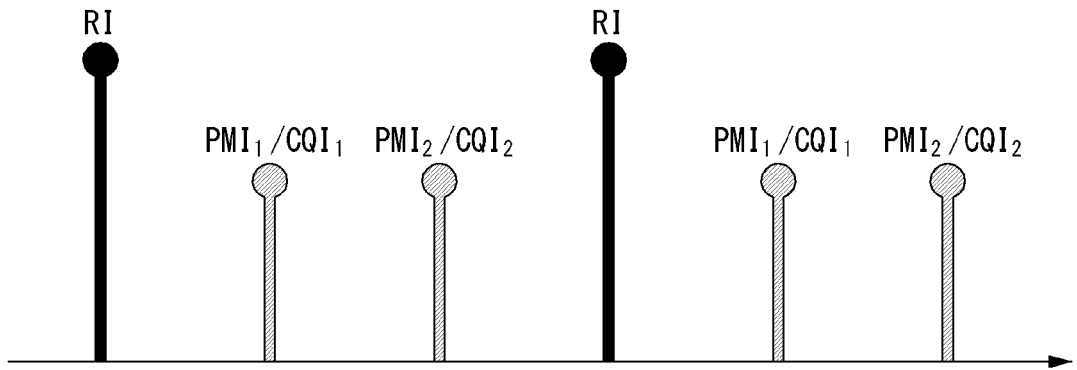
[FIG. 12]
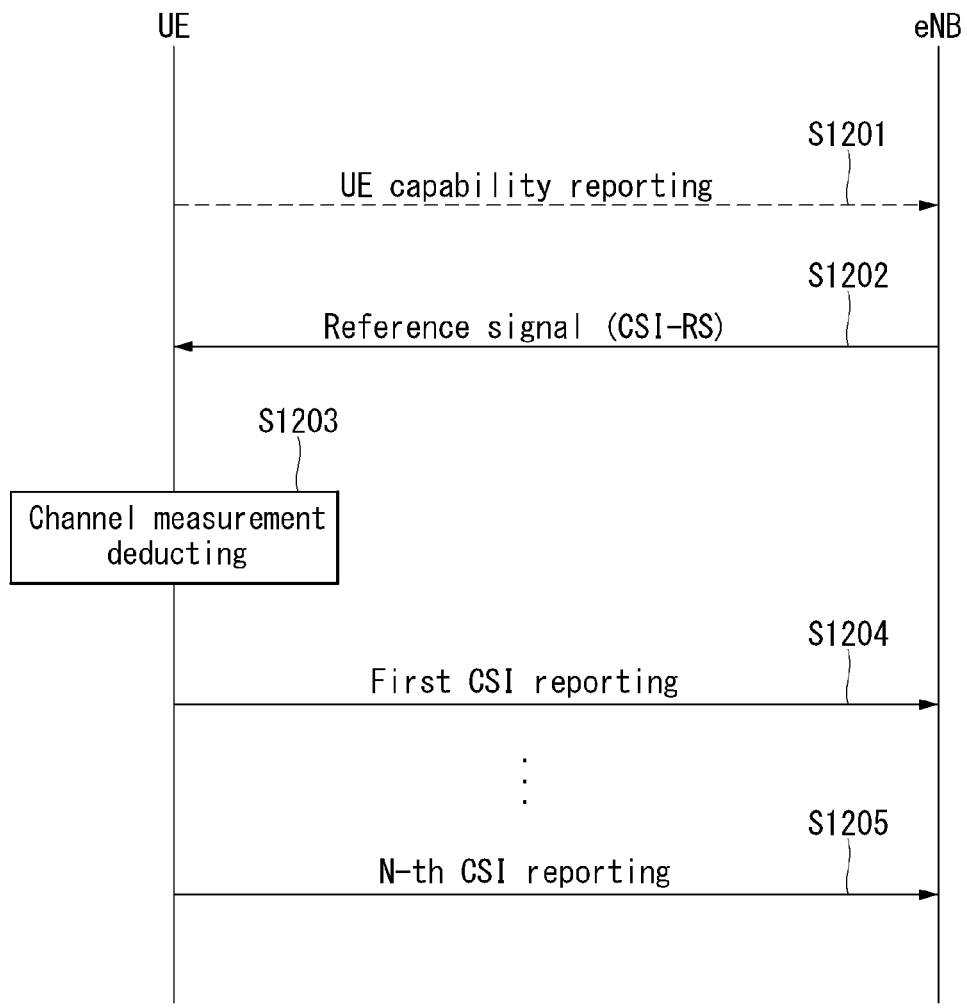

[FIG. 13]
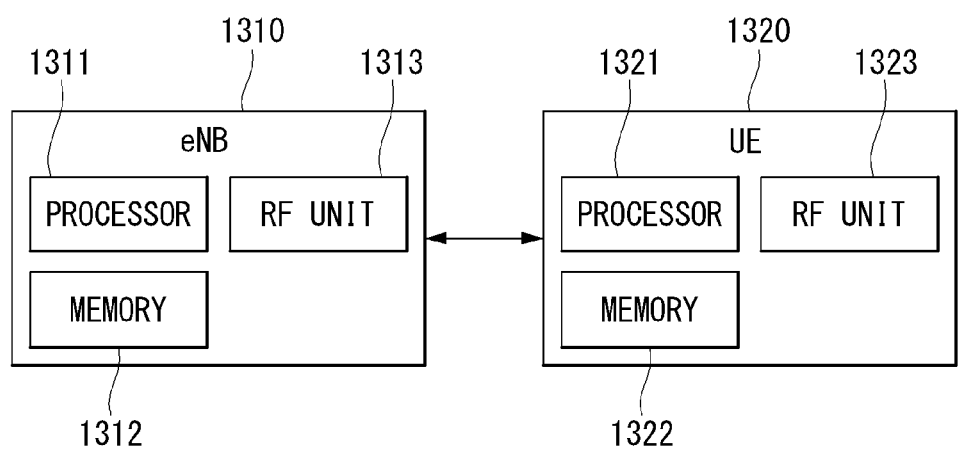

METHOD FOR TRANSMITTING AND RECEIVING CHANNEL STATE INFORMATION (CSI) IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/010331, filed on Sep. 13, 2016, which claims the benefit of U.S. Provisional Application No. 62/218,555, filed on Sep. 14, 2015, No. 62/264,817, filed on Dec. 8, 2015, the contents of which are all hereby incorporated by reference herein in their entirety.

TECHNICAL FIELD

The present invention relates to a wireless communication system, and, more particularly, to a method for transmitting Channel State Information (CSI) and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An embodiment of the present invention provides a method for transmitting and receiving channel state information (CSI).

In addition, an embodiment of the present invention provides a feedback signaling method for smoothly supporting a multiuser superposition transmission (MUST) or non-orthogonal multiple access (NOMA) transmission technique.

Technological objects to be achieved by the present invention are not limited to the aforementioned objects, and other objects that have not been described may be clearly understood by a person having ordinary skill in the art to which the present invention pertains from the following description.

Technical Solution

In one general aspect of the present invention, there is provided a method for transmitting Channel State Information (CSI) by a user equipment (UE) in a wireless communication system that supports Multiuser Superposition Transmission (MUST), the method including: reporting, to a base station, a first precoding matrix indicator (PMI) indicating a precoding matrix that is the most preferred by the UE, and a first channel quality indicator (CQI) that is calculated assuming use of the first PMI; and reporting, to the base station, a second PMI indicating a precoding matrix that is secondly preferred by the UE, and a second CQI that is calculated assuming use of the second PMI.

In another general aspect of the present invention, there is provided a user equipment (UE) that transmits channel state information (CSI) in a wireless communication system supporting multiuser superposition transmission (MUST), the UE including: a Radio Frequency (RF) unit configured to transmit and receive a radio signal; and a processor configured to control the RF unit, wherein the processor: reports, to a base station, a first precoding matrix indicator (PMI) indicating a precoding matrix that is the most preferred by the UE, and a first channel quality indicator (CQI) that is calculated assuming use of the first PMI; and reports, to the base station, a second PMI indicating a precoding matrix that is secondly preferred by the UE, and a second CQI that is calculated assuming use of the second PMI.

Preferably, the first PMI and the first CQI may be calculated assuming a rank indicator (RI) that is reported by the UE to the base station, and the second PMI and the second CQI may be calculated assuming the RI or a predefined RI.

Preferably, a periodicity and/or a granularity of the first PMI and the first CQI may be identical to a periodicity and/or a granularity of the second PMI and the second CQI.

Preferably, the second CQI may be reported as a differential CQI value relative to the first CQI.

Preferably, the second PMI may indicate a precoding matrix that is selected from a subset of a codebook from which the first PMI is selected.

Preferably, the subset may be composed of a precoding matrix that generates a beam of which correlation with a beam formed by the first PMI is equal to or greater than a preset threshold.

Preferably, the subset is composed of a precoding matrix which generates a beam orthogonal to a beam formed by the first PMI, or a precoding matrix which generates a beam not orthogonal to the beam formed by the first PMI.

Preferably, the subset may be composed of a precoding matrix which generates a beam having co-phasing identical to co-phasing of a beam formed by the first PMI, or a precoding matrix which generates a beam having other co-phasing except for co-phasing being orthogonal to the beam formed by the first PMI.

Preferably, both the first PMI and the second PMI may be selected from a codebook for beam selection and co-phasing.

Preferably, a granularity of the second PMI and the second CQI may be determined to be different from a granularity of the first PMI and the first CQI, or restricted only to a wideband.

Preferably, the first CQI and the second CQI may be calculated using a power allocation factor that is used for the MUST transmission to the UE.

Preferably, an absolute value of a variance of channel estimation error to correct the first CQI and the second CQI may be reported to the base station.

Preferably, UE capability information related to a MUST operation may be reported to the base station.

Preferably, the UE capability information comprises at least one of the following: a UE-supportable MUST transmission technique; a number of Successive Interference Cancellation (SIC)-capable spatial layers; a receiver type, whether SIC is supported depending on a layer received by a UE; a number of superposed UEs per supportable layer; a total number of cancellation capable superposed UEs; a total number of cancellation-capable spatial layers; whether MUST CSI reporting is supported; and a unit or number of blind detection (BD)-capable MUST power offsets.

Advantageous Effects

The present invention has an advantage in that a plurality of CSI is reported to a base station and thus the base station is able to consider more MUST paring candidates, so that a probability of paring of UEs performing a MUST operation is increased and therefore performance of a MUST system is enhanced.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 illustrates reference signal patterns mapped to downlink resource block pairs in a wireless communication system to which the present invention may be applied.

FIG. 8 is a diagram illustrating resources to which reference signals are mapped in a wireless communication system to which the present invention may be applied.

FIG. 9 is an example illustrating a concept of an interference cancellation technique used in a wireless communication system to which the present invention can be applied.

FIG. 10 is a diagram illustrating hierarchical modulation in a wireless communication system to which the present invention can be applied.

FIG. 11 is a diagram illustrating multiple channel state information feedback according to an embodiment of the present invention.

FIG. 12 is a diagram illustrating an example of a method for transmitting and receiving Channel State Information (CSI) according to an embodiment of the present invention.

FIG. 13 is a diagram illustrating block configuration of a wireless communication apparatus according to an embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1 (b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point.

The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots.

This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-MD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{[Equation 2]}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$H = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, 18, and p=15, . . . , 22, respectively. A CSI-RS may be defined for only a subcarrier interval M=15 kHz.

In a subframe configured for CSI-RS transmission, a CSI-RS sequence is mapped to a complex-valued modulation symbol $a\_k,l^(p)$ used as a reference symbol on each antenna port p as in Equation 12.

$$a_{k,l}^{(p)} = w_{l''} \cdot r_{l,n_s}(m') \quad \text{[Equation 12]}$$

$$k = k' + 12m + \begin{cases} -0 & \text{for } p \in \{15, 16\}; \text{ normal cyclic prefix} \\ -6 & \text{for } p \in \{17, 18\}; \text{ normal cyclic prefix} \\ -1 & \text{for } p \in \{19, 20\}; \text{ normal cyclic prefix} \\ -7 & \text{for } p \in \{21, 22\}; \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations } 0-19, \\ & \text{normal cyclic prefix} \\ 2l'' & \text{CSI reference signal configurations } 20-31, \\ & \text{normal cyclic prefix} \\ l'' & \text{CSI reference signal configurations } 0-27, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{maxDL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | n_s mod 2 | (k', l') | n_s mod 2 | (k', l') | n_s mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |

TABLE 3-continued

|  | | Number of CSI reference signals configured | | | | |
|---|---|---|---|---|---|---|
| CSI reference | | 1 or 2 | | 4 | | 8 |
| signal configuration | (k', l') | $n_s$ mod 2 | (k', l') | $n_s$ mod 2 | (k', l') | $n_s$ mod 2 |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 illustrates the mapping of (k',l') from a CSI-RS configuration in an extended CP.

TABLE 4

| | | | Number of CSI reference signals configured | | | | |
|---|---|---|---|---|---|---|---|
| | CSI reference | | 1 or 2 | | 4 | | 8 |
| | signal configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI- RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10n_f + \lfloor n_s/2 \rfloor - \Delta_{CSI-RS}) \bmod T_{CSI-RS} = 0 \qquad \text{[Equation 13]}$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is p_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information—interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

NOMA (Non-Orthogonal Multiple Access)

The conventional OFDMA system employs a method of allocating a resource to each UE from a different frequency-time region (that is, an orthogonal radio resource) to support multiple users. On contrary, non-orthogonal multiple access (NOMA) refers to a multiple access technique by which the same frequency-time resource is allocated to a plurality of UEs with a pre-considered power ratio on the premise of an intervention cancellation receiver and pre-considered user-to-user intervention is reduced, thereby achieving great bandwidth efficiency. In other words, signals from two or more UEs are transmitted to the same resource, but the transmission is made using appropriate power and an appropriate transmission rate, and therefore, every UE is capable of decoding a desired signal. As such, since a plurality of UEs share the same frequency-time resource, there is a need of an algorithm by which a transmitter performs intervention cancellation (that is, another UE's signal to which the same resource is allocated).

FIG. 9 shows a concept of an intervention cancellation technique used in a wireless communication system to which the present invention can be applied.

To a plurality of UEs having a great difference in channel quality (e.g., a UE (Near UE, NUe, in FIG. 9) located in a cell central region and a UE (Far UE, FUe, in FIG. 9) located in a cell edge region), a base station transmits respective data symbols in a superposition manner. The plurality UEs to which data symbols are transmitted from the same radio resource in the superposition manner may be referred to as a NOMA pair.

In this case, low power may be allocated to the NUe, and high power may be allocated to the FUe. In other words, in the orthogonal multiple access (OMA) scheme, the same power is allocated to the NUe and the FUe. On the other hand, according to the NOMA scheme, when the total power is assumed to be p, 1/5p may be allocated to the NUe and 4/5p may be allocated to the FUe.

In this case, according to a Successive Interference Cancellation (SIC) technique, the NUe may first decode and cancel a strong interference signal of the FUe, and then decode its own signal successfully.

Then, since the interference signal of the cell central UE reaches the FUe with relatively less power, the FUe may regard the interference signal as interference and decode its own signal.

Major techniques for the NOMA system may be largely classified into a base station's resource allocation technique and a UE's interference cancellation technique. Among these, the UE's interference cancellation technique may have types as below:

Symbol-level Interference Cancellation (SIC) receiver
Maximum Likelihood (ML) receiver
Codeword level interference Cancellation (CWIC) receiver
Minimum Mean Square Error (MMSE) based L-CWIC (Linear CWIC)
ML-CWIC A different gain is achieved in a give environment depending on each type of interference cancellation technique, and, generally a higher gain is achieved in the case where the ML technique is applied in proportion to complexity of UE implementation and in the case where CWIC-type receiver is applied.

Hierarchical Modulation

Hierarchical modulation (or layered modulation) is one of technologies for multiplexing and modulating multiple data streams into a single symbol stream, and a sub-symbol of a base layer (that is, where a low-level modulation technique is applied) and a sub-symbol of an enhancement layer (that is, where a high level modulation technique is applied) are synchronously superimposed before being transmitted.

FIG. 10 is a diagram illustrating an example of hierarchical modulation in a wireless communication system in which the present invention can be applied.

When the hierarchical modulation is used, a user in a good receiving condition or an advanced receiver may demodulate and decode one or more data streams. On the other hand, a conventional receiver or a receiver in a poor receiving condition may demodulate and decode only embedded data streams in a low layer(s) (e.g., the base layer).

Theoretically, hierarchical modulation is regarded as one of practical implementations of superposition precoding, and has been proposed to achieve a maximum sum rate of a Gaussian broadcast channel with interference cancellation in a receiver. In light of network operation, a network operator may seamlessly target a service having QoS or a different service when hierarchical modulation is used. However, traditional hierarchical modulation is affected by inter-layer interference (ILI) and thus dented by interference from a signal(s) with a high rate which is achievable using a low-layer data stream (e.g., a base-layer data stream). For example, in the case of two-layer symbol that is hierarchically modulated with a 16 Quadrature Amplitude Modulation (QAM) base layer and a Quadrature Phase Shift Keying (QPSK) enhancement layer, when the entire signal-to-noise (SNR) ratio is approximately 23 dB, a loss in the base-layer throughput may be approximately 1.5 bit/symbol due to inter-layer interference. This amounts to approximately 37.5% (1.5/4) of an achievable throughput of the base layer with a SNR of 23 db. Meanwhile, a demodulation error rate of any one of a base-layer symbol and an enhancement-layer symbol is increased as well. Accordingly, it is actively being discussed to recover performance loss of hierarchical modulation.

Furthermore, due to simple a diversity gain and high spectral efficiency, accompanying with simple design of a receiver, multicarrier transmission (e.g., OFDM) is broadly used not just as a next-generation wireless network, but also in a broadcast multicast service (BCMCS).

However, especially in the case of modulation by high-order signal constellation, advantages of the OFDM are counter-balanced by a high peak-to-average-power ratio (PAPR).

A high PAPR of a signal modulated by the transmitter dramatically reduces an average output power of a high power amplifier (HPA) due to back-off. In addition, a receiver increases demodulation and decoding errors, thereby limiting a throughput of the whole transceiver chain. Thus, it is important to understand how hierarchical modulation affects a PAPR of multicarrier modulation.

Precoding

A precoder receives a vector's block $x(i)=[x^{(0)}(i) \ldots x^{(u-1)}(i)]^T$ ($i=0, 1, \ldots, M_{symb}^{layer}-1$) from layer mapping, and generates a vector's block $y(i)=[\ldots y^{(p)}(i) \ldots]^T$ ($i=0, 1, \ldots, M_{symb}^{ap}-1$) to be mapped to a resource on each antenna port. In this case, $y^{(p)}(i)$ denotes a signal for an antenna port p. $M_{symb}^{layer}$ denotes the number of demodulation symbols to be transmitted per layer for a physical channel. $M_{symb}^{ap}$ denotes the number of demodulation symbols to be transmitted per antenna port for a physical channel.

Pre-Coding for Transmission on a Single Antenna Port

For transmission on a single antenna port, precoding is defined as Equation 14, as below.

$$y^{(p)}(i)=x^{(0)}(i) \quad \text{[Equation 14]}$$

In this case, $p \in \{0, 4, 5, 7, 8\}$ is the number of a single antenna port used for transmission of a physical channel, and $i=0, 1, \ldots, M_{symb}^{ap}-1$, $M_{symb}^{ap}=M_{symb}^{layer}$.

Precoding for spatial multiplexing using an antenna port with a cell-specific reference signal Precoding for spatial multiplexing using an antenna port accompanying a cell-specific reference signal is used in combination with layer mapping for spatial multiplexing. Spatial multiplexing supports two or four antenna ports, and used set of antenna ports are $p \in \{0,1\}$ and $p \in \{0,1,2,3\}$.

Precoding without Cyclic Delay Diversity (CDD)

Precoding for spatial multiplexing without CDD is defined as Equation 15, as below.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(v-1)}(i) \end{bmatrix} \quad \text{[Equation 15]}$$

In this case, a precoding matrix W(i) has size of P×υ, and $i=0, 1, \ldots, M_{symb}^{ap}-1$, $M_{symb}^{ap}=M_{symb}^{layer}$.

For spatial multiplexing, a value of W(i) is selected from among precoder elements in a codebook which is set in an eNB and a UE. Using codebook subset restriction, the eNB may restrict selection of a precoder in a UE to a subset element in the codebook. The set codebook is selected from the following Table 7 or Table 8.

Precoding for large-delay CDD

For large-delay CDD, precoding for spatial multiplexing is defined as in Equation 16, as below.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{[Equation 16]}$$

In this case, a precoding matrix W(i) has a size of P×υ, and $i=0, 1, \ldots, M_{symb}^{ap}-1$, $M_{symb}^{ap}=M_{symb}^{layer}$. A matrix D(i), which supports CDD and has a diagonal size of υ×υ, and a matrix U, which has a size of υ×υ, are given according to the number of layers u from the following Table 6.

Values of the precoding matrix W(i) are selected from among precoder elements in a codebook which is configured in the eNB and the UE. Using codebook subset restriction, the eNB may restrict selection of a precoder in the UE to an element subset in the codebook. The set codebook is selected from the following Table 7 or Table 8.

In the case of two antenna ports, a precoder is selected according to W(i)=C_1. In this case, C_1 denotes a precoding matrix corresponding to a precoder index 0 in the following Table 7.

In the case of four antenna ports, the UE may assume that the eNB rotationally allocates different precoders to different vectors on a PDSCH as below. A different precoder may be used in each u vector. In this case, u denotes the number of transport layers in the case of spatial multiplexing. In particular, a precoder is selected according to W(i)=C_k. In this case, k is a precoder index that is given according to $$k = \left(\left\lfloor \frac{i}{v} \right\rfloor \mod 4\right) + 1 \in \{1, 2, 3, 4\}.$$

In addition, C_1, C_2, C_3, and C_4 respectively denote precoder matrixes corresponding to precoder indexes 12, 13, 14, and 15 in the following Table 8.

Table 6 shows examples of large-delay CDD.

TABLE 6

| Number of layers $\upsilon$ | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{\sqrt{2}}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

Codebook for precoding and CSI reporting

For transmission on two antenna ports P∈{0,1}, and for CSR reporting based on two antenna ports P∈{0,1} or P∈{15,16}, the precoding matrix W(i) is selected from the following Table 7 or a subset thereof. For a closed-loop spatial multiplexing transmission mode, a code index 0 is not used when the number of layers is $\upsilon$=2.

Table 7 shows an example of a codebook for transmission on an antenna port {0,1} and for CSI reporting that is based on an antenna port {0,1} or {15,16}.

TABLE 7

| Codebook index | Number of layers $\upsilon$ | |
|---|---|---|
| | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{\sqrt{2}}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{\sqrt{2}}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | — |

For transmission on four antenna ports P∈{0,1,2,3}, the precoding matrix W is selected from the following Table 8 or a subset thereof. For CSI reporting based on four antenna ports P∈{0,1,2,3} or P∈{15,16,17,18}, the precoding matrix W may be selected from the following Table 8 or a subset thereof. $w_n^{[s]}$ denotes a matrix that is defined by a column given by a set {S} from the equation $w_n = 1 - 2u_n u_n^H / u_n^H u_n$. In this case, I denotes a 4×4 unit matrix, and a vector is given from the following Table 8.

Table 8 shows an example of a codebook for transmission on an antenna port {0,1,2,3} and for CSI reporting that is based on antenna port {0,1,2,3} or {15,16,17,18}.

TABLE 8

| Codebook Index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Method for Transmitting and Receiving Channel State Information (CSI) for MUST Transmission The Multiuser Superposition Transmission (MUST) scheme may be classified as below:
MUST category 1: superposition transmission in which an adaptive power ratio on composite constellation and a non-Gray-mapped composite constellation are applied
MUST category 2: superposition transmission in which an adaptive power ratio on composite constellation and Gray-mapped composite constellation are applied
MUST category 3: superposition transmission in which label-bit assignment on composite constellation and Gray-mapped composite constellation are applied In a MUST system, with a superposition coding technique, information are respectively transmitted to different UEs using the same time and frequency resource.

That is, a transmission signal S1 according to a modulation order to be applied to a signal for UE1 having a good geometry (Near UE, NU) (e.g., a UE which is relatively close to a base station or which has no obstacle on a radio path to the base station) and a signal s0 according to a modulation order to be applied to a signal for UE0 having a bad geometry (Far UE, FUe) (e.g., a UE which is relatively fat from a base station or which has an obstacle on a radio path to the base station) are superpositioned, and the superposed signal is transmitted to each UE.

In this case, a procedure for decoding a reception signal of each UE is as follows.

First, when rank-1 transmission is assumed, a reception signal of UE1 may be expressed as in Equation 17, as below.

$$y_1 = H_1(\alpha p_1 s_1 + (1-\alpha) p_0 s_0) + n_1 = H_1 \alpha p_1 s_1 + H_1(1-\alpha) p_0 s_0 + n_1$$ [Equation 17]

In this case, H_1 denotes a channel between a base station and UE1, $\alpha (0 < \alpha < 1)$ denotes a power allocation factor, $p_i (i=0,1)$ denotes a normalized precoding vector for the i-th UE, and n denotes a Gaussian noise vector.

In this case, if $p_0 = p_i$, it may be understood as a situation in which the same beam restriction is taken into account.

UE1 first decodes s0 of UE0, which is a relatively strong power signal, performs Successive Interface Cancellation (SIC) to cancel S0 contained in the reception signal, and then decode a signal of UE1. The above-described decoding method of UE 1 may vary depending on a reception algorithm, such as CWIC, SLIC, and ML.

Next, a reception signal of UE0 may be expressed as in Equation 18, as below.

$$y_0 = H_0(\alpha p_1 s_1 + (1-\alpha) p_0 s_0) + n_0 = H_0(1-\alpha) p_0 s_0 + H_0 \alpha p_1 s_1 + n_1$$ [Equation 17]

In this case, H_0 denotes a channel between a base station and UE0, H_0 denotes a power allocation factor, $p_i$ (i=0,1) denotes a normalized precoding vector for the i-th UE, and n denotes a Gaussian noise vector.

Generally, UE0 regards other superposed signals, except for its own signal as interference, and performs decoding.

Hereinafter, the present invention proposes a signaling method related to a UE's feedback for a MUST system, the method including the above-described technique.

CSI(PMI/CQI/RI) feedback

To improve performance of the MUST system, a probability to become a UE pair (that is, the aforementioned UE0 and UE1) performing a MUST operation may be increased, or interference may be minimized by UE0.

First, an example of increasing MUST UE pairs is as below: a UE sends a feedback on a plurality of PMIs and corresponding CQIs to the base station, and therefore, a base station is able to consider a more number of MUST paring candidates when performing scheduling. This may result in increasing the probability of occurrence of MUST paring.

1. A UE's basic feedback operation defined by the current 3GPP is sending a feedback on the most preferred PMI, which is measured through a CSI-RS, and a corresponding CQI to the base station.

In the case of multiple PMI feedback for increasing MUST UE pairs according to an embodiment of the present invention, the following method may be considered.

Hereinafter, for convenience of explanation, the most preferred PMI and a CQI corresponding thereto are referred to as the first PMI ($1^{st}$ PMI) and the first CQI ($1^{st}$ CQI), and the n-th preferred PMI and a CQI corresponding thereto are referred to as the n-th PMI and the n-th CQI.

FIG. 11 is a diagram illustrating multiple channel state information feedback according to an embodiment of the present invention.

Referring to FIG. 11, a UE may report n number of PMIs/CQIs to a base station in a cycle of RI (that is, between successive RI reporting times). FIG. 11 shows the case where two PMIs/CQIs (that is, PMI_1 (the first PMI)/CQI_1 (the first CQI) and PMI_2 (the second PMI)/CQI_2 (the second CQI)) are reported between successive RI reporting times.

Hereinafter, for convenience of explanation, the method proposed in the present invention is described assuming n=2, but the present invention is not limited thereto.

The n-th CQI may be determined based on a Signal-to-Interference-plus-Noise-Ratio (SINR) that can be achievable using the n-th PMI/CQI. In this case, a different SINR may be determined for each n-th PMI/CQI.

In this case, every n-th PMI/CQI (that is, all PMIs/CQIs including the first PMI/CQI) may share the same RI value, and may be calculated assuming the shared RI. That is, every n-th PMI/CQI may be calculated assuming an RI that is reported by a UE to the base station.

In another example, only the first PMI/CQI may use an RI value, and other PMIs/CQIs may be calculated assuming a specific rank (that is, an RI value) (e.g., rank=1).

In this case, a specific RI to be assumed for calculation of PMIs/CQIs may be determined by the base station and informed of a UE.

In another example, an RI to be assumed for calculation of other PMIs/CQIs, except for the first PMI/CQI, may be determined by a function for an RI value of the first PMI/CQI. For example, when the RI value of the first PMI/CQI is equal to or smaller than n, other PMIs/CQIs may be determined by the RI value of the first PMI/CQI, and, when the RI value of the first PMI/CQI is equal to or greater than n, other PMIs/CQIs may be determined assuming a specific RI value (a predetermined RI value or the like).

In another example, the UE may distinguishes an RI used for calculation of the first PMI/CQI and a RI commonly used for calculation of the n-th PMI/CQI, and the UE may report both of the two RIs to the base station.

2. As illustrated in FIG. 11, the first PMI/CQI and the second PMI/CQI may be feedback with the same periodicity and/or granularity (e.g., a PMI/CQI granularity in a frequency region).

Furthermore, the first and second CSI (in this case, CSI means channel information including one or more selected from among RI, PMI, and CQI) may be restricted to having different offsets.

In this case, when values of the first and second CSIs need to be reported through a PUCCH in the same subframe, in other words, when collision occurs, the first CSI may be first reported and the second CSI may be dropped. That is, in the case where collision between the N-th CSI and the M-th CSI occurs, if N>M, the UE may first report the M-th CSI, and, if not, the UE may first report the N-th CSI.

2-A. In the above example, to reduce the number of feedback bits, the second CQI may feedback a predefined difference relative to the first CQI. That is, the second CQI may be reported as a differential CQI value relative to the first CQI.

As a more detailed example, differential CQI values relative to the first CQI may be defined in advance, and these values may be feedback. An example thereof is as in the following Table 9.

TABLE 9

| Bit mapping | Differential CQI value | Offset level |
|---|---|---|
| 00 | 0 | −1 |
| 01 | 1 | −2 |
| 10 | 2 | −3 |
| 11 | 3 | <=−4 |

Referring to Table 9, when the second CQI is smaller than the first CQI by 1, a UE reports differential CQI value=0 as the second CQI to the base station. When the second CQI is smaller than the first CQI by 2 or 3, the UE reports Differential CQI value 1 or 2, respectively, as the second CQI to the base station. When the second CQI is smaller than the first CQI by 4 or more, a UE reports Differential CQI value=3 as the second CQI to the base station.

2-B. In the case of the second PMI, the second PMI may be feedback to a subset of a codebook from which the first PMI is feedback (e.g., W1 from which the first PMI is selected when the first PMI is expressed as a dual codebook of W1 and W2) and thus feedback bits may be reduced. That is, the second PMI may indicate a precoding matrix that is selected within a subset of the codebook from which the first PMI is selected.

In this case, as an example of restricting a subset, the subset may be restricted to beams in a codebook (that is, precoding matrixes forming the corresponding beams) of which correlation with the first PMI is equal to or greater than a specific threshold. That is, the subset may be composed of a precoding matrix of which correlation with the first PMI is equal to or greater than a predetermined threshold.

In this case, the second CQI corresponding to the second PMI may be feedback in the above-described method 2-A.

2-B-i. As one example, a codebook W=W1·W2 having a dual structure that is represented by 3GPP Rel.10 8Tx, Rel.12 4Tx, Rel.13 12Tx, 16Tx, etc. may be used as an example. In this case, W1 represents a channel's long-term/wide band characteristics, and W2 represents a channel's short-term/subband characteristics.

A UE may select the second PMI from among beams belonging to a beam group (that is, a precoding matrix group) of W1 to which the first PMI selected from the dual codebook belongs. In this case, the UE may report to the base station in the following manner.

1) In Rank 1 and 2, beam groups formed by W1 overlap with W1 of an adjacent index, and thus, a UE searches for an adjacent W1 PMI partially overlapping with beams of the first W1 PMI, selects any one of the first W1 PMI and the adjacent W1 PMI through a 1-bit feedback, and reports the selected PMI to the base station so as to report information of W1 of the second PMI. That is, the first W1 PMI or the adjacent W1 PMI indicated by the 1 bit reported by the UE may correspond to the second W1 PMI. Using W2 corresponding to the reported second W1 PMI, the second PMI may be selected.

For example, W1 PMI 0 and W1 PMI 1 in 8Tx codebook share some beam groups. In this case, if the first W1 PMI is 0, the UE may feedback one of W1 PMI 0 and W1 PMI 1 as the second W1 PMI.

Alternatively, a UE may find two adjacent W1 PMIs partially overlapping with beams of the first W1 PMI, select the second W1 PMI from the three W1 PMI, and report the selected second W1 PMI.

2) In another example, if an additional W1 feedback (that is, a bit feedback for selecting the second W1 PMI) is not considered, a UE may restrict (or assume) the second W1 PMI to W1 identical to that of the first W1 PMI, and then select the second PMI from corresponding W2 and report the selected second PMI to the base station.

2-B-ii. In the case where a UE reports the second PMI using the above-described method 2-B-i, the first PMI and the second PMI may orthogonal to each other due to co-phrasing. Using this characteristic, reporting of the second PMI may be restricted as follows.

1) The reporting may be restricted to selecting the second PMI from second other W2 PMIs, except for a second W2 PMI, which generates a beam orthogonal to the final first PMI determined to be W1 and W2, and reporting the selected second PMI. That is, a subset may be composed of a precoding matrix which generates a beam not orthogonal to a first PMI.

2) In another example, the reporting may be restricted to selecting a second W2 PMI from among second W2 PMIs, which generate a beam orthogonal to a final first PMI determined to be W1 and W2, and reporting the selected second W2 PMI. That is, a subset may be composed of a precoding matrix which generates a beam orthogonal to a first PMI.

3) In another example, the reporting may be performed such that a subset is limited to a subset of W2 having co-phasing identical to co-phasing of the first PMI in W2 and the second PMI is selected from the corresponding subset.

4) In the case of the Rel.12 4Tx codebook, each two beams in four beams which form W1 are orthogonal to each other. That is, in the case of i1 which is an index of W1, if i1=0, W1 is composed of beams {0,8,16,24}, and, in this case, beams {0,16} and {8,24} are orthogonal to each other. Thus, when the first PMI is selected as 0, the second PMI may be selected from the $8^{th}$ and $24^{th}$ beams. Therefore, the second PMI may be reported to the base station with a 1-bit feedback (that is, the $8^{th}$ or $24^{th}$ beam), thereby reducing overhead.

In addition, if co-phasing components are considered, co-phasing is composed of QPSK, that is, {1, j, −1, −j}, and, if {1, −1} and {j, −j} are selected for the same beam, they may be orthogonal to each other. The second PMI may be selected from a codebook composed of other co-phasing, except for the above co-phasing orthogonal to a beam for which a first PMI is selected, and a UE may report the selected second PMI as 1-bit feedback.

The above proposed selection restriction and co-phasing restriction may be configured independently or in combination. In addition, when W1 is configured, the above method may be easily applied in configuring a codebook in which orthogonal beams are included.

5) In the case of the Rel.10 8Tx/Rel.13 8Tx, 12Tx, 16Tx codebook, beams of W1 are closely spaced, so beams in the same W1 are not orthogonal to each other but have greater correlation with each other. Thus, by taking into consideration only beam selection from among W1 beams to which a first PMI belongs, a UE may report 2 bits as the second PMI.

In addition, if co-phasing is considered, the co-phasing is composed of QPSK, that is, {1, j, −1, −j}, and, when {1, −1} and {j, −j} are selected for the same beam, they are orthogonal to each other. The second PMI may be selected from a codebook composed of co-phasing, except for the above co-phasing orthogonal to a beam for which a first PMI is selected, and a UE may report a 1-bit feedback as the second PMI.

The above proposed beam selection restriction and co-phasing restriction may be configured independently or in combination. In addition, when W1 is configured, the above proposed method may be easily applied to a codebook in which closely spaced beams are configured.

2-B-iii. If a MUST operation is performed using a beam-formed CSI-RS, the first PMI and the second PMI may be reported to the base station only using a W2 feedback. That is, in the above-described dual codebook structure, the first PMI and the second PMI may be reported using a W2 (composed of beam selection and co-phasing) codebook.

In this case, the first PMI and the second PMI may be reported sequentially, or the second PMI may be reported using the W2 codebook when there is RRC or dynamic signaling (e.g., a CSI reporting request instruction within a PDCCH).

In addition, the first PMI and the second PMI may be reported in a joint manner. To this end, rank 2 codebook composed of only a selection vector may be used.

For example, if there are beams 1, 2, 3, and 4, a codebook composed of a selection vector having combinations of (1,2), (1,3), (1,4), (2,1), (2,3), (2,4), (3,1), (3,2), and (3,4) may be configured, and, if this codebook is reported, the base station may be implicitly informed of the fact that the first column is the first PMI and the second column is the second PMI.

2-B-iv. As another example, codebook subset restriction may be used.

The base station may distinguishably inform a UE of CBSR1, which indicates a PMI set for the first PMI, and CBSR2, which indicates a PMI set for the second PMI. In addition, the UE may find out the first PMI in the CBSR1 and report the found first PMI, and find out the second PMI in the CBSR2 and reports the found second PMI.

2-B-v. As another example, a UE may arrange PMIs in a descending order of correlation with the first PMI, and generate a PMI subset only for M number of PMIs having high correlation with the first PMI. Then, the UE finds out the second PMI from the generated PMI subset, and report the found second PMI to the base station. In this case, a value of M may be configured by the base station to the UE through higher layer signaling (e.g., RRC signaling or the like), or may be determined by the UE and reported to the base station.

If there is a plurality of PMIs having the same correlation with the first PMI and some PMIs to be included in a PMI subset need to be selected from among those PMIs, the UE may configure a set by preferring the lowest PMI index. For example, when M=4 and PMI 1, PMI 2, PMI 3, PMI 4, and PMI 5 are respectively have correlation 0.9, 0.9, 0.9, 0.8, and 0.8 with respect to the first PMI, PMI4 is included in a PMI subject and PMI5 is excluded from the PML subset.

2-B-vi. The above examples are about reporting only the second PMI additionally, but the present invention is not limited thereto, and it is obvious that the above methods may be applied even when reporting a plurality of PMIs such as the third and fourth PMIs.

2-B-vii. When the second W1 PMI is reported in a restricted set W1 using the above method 2-B-i-I, vectors other than beam vectors formed by the first W1 PMI may be selected depending on a selection vector of the second W2 PMI. Thus, in order to restrict a beam vector of the second W1 PMI to beam vectors formed by the first W1 PMI, a selection vector of the second W2 PMI may be restricted, so that a beam vector of a finally selected second W1 PMI is necessarily included in a beam set of the first W1 PMI.

For example, if the first W1 PMI is [v0 v 1 v2 v3] (where vi indicates the number of TX antenna ports/2 by 1 column vector) and one of A=[v0 v1 v2 v3], B=[v2 v3 v4 v5], and C=[v14 v15 v0 v1] is reported as the second W1 PMI, a selection vector of the second W2 PMI may be restricted as follows.

If A is reported as the second W1 PMI, there may be no restriction to the selection vector.

If B is reported as the second W1 PMI, the selection vector may be restricted to a vector that selects the first and second vectors.

If B is reported as the second W1 PMI, the selection vectors may be restricted to a vector that selects the third and fourth vectors.

As another example, the first W2 PMI and the second W2 PMI may be simply restricted to having the same selection vector all the time. (For reference, a W2 PMI may be composed of: a selection vector for selecting some beams from a beam vector set of W1; and co-phasing to be applied to a selected beam)

2-C. In the case of a 2 Tx codebook that does not follow the dual codebook structure, a UE may report the second PMI in the following method in a manner similar to the above described method B.

In the case of 2 Tx codebook, rank 1 may be composed of $$\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix},$$

and rank 2 may be composed of $$\frac{1}{2}\begin{bmatrix}1&1\\1&-1\end{bmatrix}, \frac{1}{2}\begin{bmatrix}1&1\\j&-j\end{bmatrix}$$

In this case, in Rank 1, beams having indexes {0,1} and {2,3} are orthogonal to each other.

For example, if $$\frac{1}{\sqrt{2}}\begin{bmatrix}1\\1\end{bmatrix}$$

is selected as the first PMI, the second PMI may be restricted to $$\frac{1}{\sqrt{2}}\begin{bmatrix}1\\j\end{bmatrix}, \frac{1}{\sqrt{2}}\begin{bmatrix}1\\-j\end{bmatrix}$$

and thus selected from them, and this may be reported to the base station as 1-bit feedback.

Since Rank 2 is composed of two elements, PMI other than the first PMI which is already reported may be assumed as the second PMI, without an additional feedback. In this case, the second CQI corresponding to the second PMI need to be feedback additionally.

Alternatively, in the case of the first PMI in Rank 1, the second PMI in Rank 1 may be assumed to be orthogonal to the first PMI and the 2nd CQI is calculated and the second PMI may not be reported.

As such, the second PMI is determined to be a single value depending on the first PMI, so a UE may not report the second PMI but may report only the second CQI, that is, a CQI which is achievable when the second PMI is used (when a PDSCH is received through the second PMI).

report a subband first CSI and a subband second CSI separately with respect to subband CSIs.

In this case, a subset of the second CSI for each subband may be configured identically or differently.

Enhanced CQI feedback

If channel estimation is perfectly done in the above-described MUST scheme, UE1 may perfectly cancel a superposed signal of UE0 through SIC. However, if there is a channel estimation error, performance degradation may occur due to CQI mismatch caused by a residual interference.

To solve this, the present invention proposes a CQI compensation method as follows. First, a receive SINR on the n-th layer of the r-th resource having gone through CWIC in UE1 is presented as in Equation 19, as below.

$$SINR_n^{CWIC}(r) = \frac{\alpha \|w_n(r)h_n(r)\|^2}{(1-\alpha)\sigma_{\tilde{H}}^2 + \sum_{m \neq n} \|w_n(r)h_m(r)\|^2 + w_n(r)R_{ee}w_n^H(r)} \quad \text{[Equation 19]}$$

2-D. When the second PMI and a CQI corresponding thereto are subband feedback, they may be feedback with granularity different from granularity of the first PMI. That is, the second PMI and the CQI corresponding thereto may be feedback with a subband size, which is N times greater than a conventional subband size, and a value of N may be informed by the base station to the UE through upper layer signaling (e.g., RRC signaling or the like).

2-D-i. As another example, the base station may make a UE informed of a reporting timing of the second CSI (PMI/CQ/RI) through RRC or dynamic signaling.

For example, when the base station makes the second CSI report ON (that is, activated) through RRC signaling, the UE may report the second CSI through a PUCCH/PUSCH until the base station makes the second CSI report OFF (that is, deactivated).

In this case, in order to solve RRC configuration ambiguity between the base station and the UE, the UE may additionally receive an ON signaling from the base station and inform the base station, through the PUCCH/PUSCH, that the second CSI will be reported in a next subframe.

Configuration ambiguity about an OFF signaling may be solved in the similar way. That is, the UE may receive the OFF signaling from the base station and inform the base station, through the PUCCH/PUSCH, that the second CSI will not be reported in a next subframe.

2-E. The second PMI and a CQI corresponding thereto may be restricted to be feedback only as wideband (WB).

2-E-i. In a subband PMI reporting mode, it may be restricted to sending only a WB second PMI.

2-E-ii. In a subband CQI reporting mode, it may be restricted to sending only a WB second CQI.

2-E-iii. The above methods E-I and E-ii may be set independently or integratedly.

3. In the case where a WB PMT is feedback as W1 and a subband PMI is feedback as W2, an example of configuring the second PMI is as follows. For example, the PUSCH feedback modes 2-2 and 2-3 are examples of this reporting method.

3-A. Using the above method 2-B, a subset for the second PMI may be configured. In this case, a feedback may be sent for each subband independently.

3-B. A UE may report one common value as one WB CSI with respect to a WB first CSI and a WB second CSI, and In this case, $\sigma_{\tilde{H}}^2 = tr(R_{ee})/(G_{CE}N_{RX})$ denotes a variance of a channel estimation error $\tilde{H}=H-\hat{H}$; N_RX denotes the number of receiver antennas; G_CE denotes a channel estimation processing gain, which is generally assumed to be G_CE=10. In addition, $R_{ee}$ is a variance matrix taking into consideration of an interference, a noise, and an Error Vector Magnitude (EVM), and w_n denotes a linear receive filter of the n-th layer.

If interference is canceled between fully superposed signals, a value of $\sigma_{\tilde{H}}^2$ is 0.

In general, the UE may feedback a CQI where SU-MIMO is assumed, and, based on this value, the base station may perform scheduling and/or MUST UE paring.

In a situation where SU-MIMO is assumed, UE0 and UE1 may define a reported CQI as CQI_0 and CQI_1, respectively, as below, and CQI_1 associated with the above Equation 19 may be expressed as in Equation 20, as below.

$$CQI_1(n, r) = \frac{\|w_n(r)h_n(r)\|^2}{\sum_{m \neq n} \|w_n(r)h_m(r)\|^2 + w_n(r)R_{ee}w_n^H(r)} \quad \text{[Equation 20]}$$

Equation 20 represents a reception SINR of the n-th layer of the r-th resource where SU-MIMO is assumed, and the UE quantizes this value and sends a feedback thereon to the base station (that is, CQI report). Then, an SINR of a MUST pair restored with the reported CQI is expressed as in Equation 21, as below.

Hereinafter, for convenience of explanation, an index of (n, r) is omitted.

$$SINR_0 = \frac{(1-\alpha)CQI_0}{\alpha CQI_0 + 1} \quad \text{[Equation 21]}$$

$$SINR_1 = \alpha CQI_1$$

Equation 21 is an equation used by the base station to obtain an SINR using a reported CQI when ideal channel estimation and ideal interference cancellation are assumed.

However, if interference cancellation is not perfectly done due to a channel cancellation error, $(1-\alpha)\sigma_{\tilde{H}}^2$ which is a residual interference term may exist as in Equation 19, and therefore the SINR may not be restored accurately and this may result in performance degradation. Therefore, the present invention proposes a method for enhancing CQI performance of the MUST scheme.

1. A predetermined fixed power allocation factor α may be used, or the base station may inform a UE of α in advance through RRC signaling. In this case, the UE may calculate an SINR using Equation 19, quantize the SINR, and send a feedback thereon to the base station (that is, CQI report).

2. The UE may additionally feedback an absolute value of $\sigma_{\tilde{H}}^2$ to the base station.

In this case, the base station may inverse a sum of interference and noise, which corresponds to the denominator, using Equation 20, and correct residual interference by adding $\sigma_{\tilde{H}}^2$ which is additionally feedback.

3. Similarly to the above method 2, the method of reporting an absolute value of $\sigma_{\tilde{H}}^2$ may require more feedback bits. Thus, to reduce feedback bits, the UE may feedback a desired signal power (corresponding to the numerator in Equation 19) ratio and/or an interference plus noise (corresponding to the second and third terms in the denominator in Equation 19) ratio to the base station. Then, the base station may inverse a value of the compensated CQI, using the above-described ratio to be feedback.

4. The above-described CQI compensation method is an example which uses a receiving method in which UE1 cancels interference from UE0 with CWIC to cancel inter-layer interference with MMSE on the assumption of the same beam restriction (that is, in the case of $p_0 = p_i$).

This CQI compensation method may be modified according to a receiving process summarized in the following Table 10 (that is, the CQI compensation method is adaptively applied).

In addition, even in the case where different precoders between MUST UEs are used, the above-described method proposed in the present invention may be easily and broadly applied.

TABLE 10

| Intra layer | Intra layer |
|---|---|
| CWIC | MMSE |
|  | CWIC |
| ML | MMSE |
|  | ML |

5. As an example by which the base station compensates a CQI when performing MUST, the following hypothesis based CQI may be considered.

A. CQI assuming UE0
B. CQ1 assuming UE1
C. CQI assuming a specific power allocation factor α
D. CQI when paring is done with a MUST UE having a specific beam.

6. In the case where a UE does not feedback a plurality of PMIs to the base station but feedbacks only the most preferred PMI (the first preferred PMI), a method of compensating for a CQI by UE1 with respect to UE0's data may be considered as an example.

6-i.:

$$SINR_0 = \frac{(1-\alpha)CQI_0\rho}{\alpha CQI_0 + 1}.$$

In this case, P is a value of correlation between a PMI of UE0 and a PMI of UE1.

This estimation method may have low CQI compensation accuracy due to a PMI quantization error. To solve this, the UE may report CQI_0' in addition to CQI_0 to the base station, and the base station may compensate a CQI using those two values.

6-ii.

$$SINR_0 = \frac{(1-\alpha)CQI_0'}{\alpha CQI_0 + 1}.$$

In this case, CQI_0' is an average CQI value corresponding to a plurality of PMIs. For example, if there is a plurality of PMIs of which correlation with the first preferred PMI is equal to or higher than a specific value (this specific value may be informed to the UE by the base station through RRC signaling, CQI_0' is an average CQI corresponding to the plurality of PMIs.

UE capability reporting

In the case of the above-described MUST operation, paring may be formed between UE1 capable of performing the MUST operation and legacy UE0 or UE0 capable of performing the MUST operation, and, in this case, if the paring is formed with legacy UE0 an enhanced receiving technique such as interference cancellation may be performed only by UE1. However, if paring is formed with UE0 capable of performing an enhanced receiving technique such as interference cancellation, UE0 may also perform interference cancellation to decode its own signal, thereby enhancing performance.

Thus, the UE capable of performing the enhanced receiving operation may request, from the base station, information required for the enhanced receiving operation, such as a power allocation factor, a MCS level, or the like. In other words, the UE may report, to the base station, a UE capability that is a capability of performing the enhanced receiving operation while receiving a basic layer (that is, a far UE), or a capability of performing the enhanced receiving operation only when receiving an enhanced layer (near UE). By considering the reported UE capability, the base station may inform the UE, through upper layer signaling (e.g., RRC signaling), of information necessary for the UE's receiving operation (e.g., a power allocation factor, an MCS level, or the like).

A UE capable of performing all the MUST schemes corresponding to the above-described three MUST categories may report a UE capability to the base station, and the base station may inform the UE, through upper layer signaling (e.g., RRC signaling), of the corresponding MUST scheme (that is, a configured MUST scheme). In addition, when performing MUST transmission toward the UE, the base station may provide a service using the MUST scheme.

Alternatively, a UE capable of performing some of the MUST schemes corresponding to the above-described three MUST categories may report a UE capability to the base station, and, when providing a service to the UE using MUST transmission, the base station may provide a service using the corresponding scheme. In this case, if the UE is capable of performing a plurality of MUST schemes, the base station may inform the UE, through upper layer signaling (RRC signaling) among the plurality of MUST schemes, a configured MUST scheme.

For example, the UE may inform the base station of whether data is able to be received properly when gray mapping is applied to superposed constellation symbols. In the case of providing a service to a UE which supports gray mapping, the base station may perform downlink transmission toward the UE, by using a MUST scheme to which gray mapping is applied.

That is, the UE reports, to the base station, UE capability information related to a MUST operation.

In this case, the UE capability may be classified by the following standards. The following standards may be used to determine UE capability by combining one standard alone or one or more standards.

1. Category: Whether the UE supports a scheme belonging which category among the above-described MUST categories.

2. The number of cancellation layers: The number of layers on which the UE is capable of performing SIC.

3. Receiver type: Which receiver types from among a candidate group of CWIC, ML, MMSE, Interference Rejection Combining (IRC), and the like are able to be used 4. Basic layer cancellation: Whether interference cancellation is performed only when a service is received by Near UE or even when a service is received by Far UE. That is, information about whether interference cancellation is supported according to a layer received by a UE.

5. The number of superposed UEs per layer: For example, superposing only one UE in one layer of Near UE may be considered, or, in the case where a plurality of UEs is superposed, whether interference cancellation is supported. That is, the number of superposed UEs for a layer that the UE is able to support.

6. The total number M of cancellation-capable superposed UEs: For example, a UE having reported M is able to cancel PDSCHs of the maximum number M of MUST UEs.

7. The total number of cancellation-capable spatial layers: for example, a UE having reported M is able to cancel a PDSCH of a MUST UE with respect to the maximum number M of spatial layers.

8. MUST CSI reporting capability: A UE reports, to the base station, whether a MUST CSI (e.g., a CSI such as the second CSI, according to the above examples) in addition to a conventional CSI can be calculated and reported.

9. A Granularity or the number of blind detection (BD)-capable MUST power offsets: For example, when a blind detection (BD) MUST is applied, a UE may detect only one determined specific power offset through blind detection (BD). For example, in the case where MUST is applied to the UE, if the entire PDSCH Tx power is P, it may be assumed that the UE's power is 0.2*P and a MUST-paired opponent UE is 0.8*P. In the case MUST transmission is not performed, the UE may perform blind detection (BD) to detect one of power P of its own PDSCH or power 0.2P of the case where MUST is performed.

In the case where a UE reports two MUST power offsets and MUST is applied to the UE, if the entire PDSCH Tx power is P, it may be such that the UE's power is 0.2*P and a MUST-paired opponent UE's power is 0.8*P or that the UE's power is 0.1*P and the MUST-paired opponent UE's power is 0.9*P. In this case, the UE may perform blind detection (BD) to detect one of the UE's power P of the case where MUST transmission is not performed and power 0.2P or 0.1P of the case where MUST transmission is performed.

A glanuarity of a BD-capable power offset indicates a variation between power offset values. If the variation is great, the offset values have big differences and thus it is easy for the UE to detect a power offset through BD, and, if the variation is small, the offset values have small differences and thus it is difficult for the UE to detect the power offset through BD.

FIG. 12 is a diagram illustrating an example of a method of transmitting and receiving channel state information (CSI) according to an embodiment of the present invention.

Referring to FIG. 21, a UE may transmit UE capability information related to a MUST operation to an eNB (S1201).

In this case, the UE capability information may include at least one of the following: a UE-supportable MUST transmission technique; a number of Successive Interference Cancellation (SIC)-capable spatial layers; a receiver type, whether SIC is supported depending on a layer received by a UE; a number of superposed UEs per supportable layer; a total number of cancellation-capable superposed UEs; a total number of cancellation-capable spatial layers; whether MUST CSI reporting is supported; and a unit or number of blind detection (BD)-capable MUST power offsets.

The UE capability reporting process may not be performed, and, in this case, the step S1201 may be omitted.

The UE receives a reference signal (especially, a CSI-RS) from an eNB through multiple antennas (S1202).

Based on the received reference signal (especially, a CSI-RS), the UE derives channel measurement (S1203).

That is, the UE generates (or calculates) channel state information (CSI) based on the reference signal (especially, a CSI-RS). In this case, as described above, the CSI includes at least one of RI, PMI, CQI, and CRI.

The UE reports the first CSI to the eNB (S1204), and the UE reports the n-th CSI to the eNB (S1205). In this case, n is a positive number, not 0, and n may be predetermined or may be configured by the eNB to the UE through upper layer signaling (e.g., RRC signaling).

For example, if n is 2, in the step S1204, the UE may report, to the base station, the first PMI indicative of the most preferred precoding matrix and the first CQI calculated assuming use of the first PMI, and then, in the step S1205, the UE may report to the base station, the second PMI indicative of the second preferred precoding matrix and the second CQI calculated assuming use of the second PMI.

In this case, the first CSI to the n-th CSI may be generated (or calculated) by the UE in the manner described above and reported to the eNB.

For example, on the assumption that n is 2, the first PMI and the first CQI may be calculated assuming an RI reported by the UE to the eNB, and the second PMI and the second CQI may be calculated assuming a reported RI or a predefined RI.

In addition, a periodicity and/or granularity of the first PMI and the first CQI may be identical to a periodicity and/or granularity for the second PMI and the second CQI. In addition, the granularity of the second PMI and the second CQI may be determined to be different from the granularity of the first PMI and the first CQI, or may be limited only to a wideband.

In addition, the second CQI may be reported as a differential CQI value relative to the first CQI.

In addition, the second PMI may indicate a precoding matrix selected from a subset of a codebook from which the first PMI is selected. In this case, a subset may be composed of a precoding matrix which generates a beam of which correlation with a beam formed by the first PMI is equal to or greater than a predetermined threshold. Alternatively, a subset may be composed of a precoding matrix which generates a beam having co-phasing identical to co-phasing of a beam formed by the first PMI, or a precoding matrix which generates a beam having other co-phasing, except for co-phasing being orthogonal to the beam formed by the first PMI.

In addition, both the first PMI and the second PMI may be selected from a codebook for beam selection and co-phasing.

In addition, the first CQI and the second CQI may be corrected by the base station in a manner described above. To this end, using a power allocation factor used for MUST transmission, the UE may calculate the first CQI and the second CQI. In order to correct the first CQI and the second CQI, the UE may report, to the eNB, an absolute value of a variance of channel estimation error (or information by which the eNB can infer the absolute value).

General Apparatus to which the Present Invention May be Applied

FIG. 13 illustrates a block diagram of a wireless communication apparatus according to an embodiment of the present invention.

Referring to FIG. 13, the wireless communication system includes a base station (eNB) 1310 and a plurality of user equipments (UEs) 1320 located within the region of the eNB 1310.

The eNB 1310 includes a processor 1311, a memory 1312 and a radio frequency unit 1313. The processor 1311 implements the functions, processes and/or methods proposed in FIGS. 1 to 12 above. The layers of wireless interface protocol may be implemented by the processor 1311. The memory 1312 is connected to the processor 1311, and stores various types of information for driving the processor 1311. The RF unit 1313 is connected to the processor 1311, and transmits and/or receives radio signals.

The UE 1320 includes a processor 1321, a memory 1322 and a radio frequency unit 1323. The processor 1321 implements the functions, processes and/or methods proposed in FIGS. 1 to 12 above. The layers of wireless interface protocol may be implemented by the processor 1321. The memory 1322 is connected to the processor 1321, and stores various types of information for driving the processor 1321. The RF unit 1323 is connected to the processor 1321, and transmits and/or receives radio signals.

The memories 1312 and 1322 may be located interior or exterior of the processors 1311 and 1321, and may be connected to the processors 1311 and 1321 with well known means. In addition, the eNB 1310 and/or the UE 1320 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described based on an example applied to the 3GPP LTE/LTE-A systems, but may be applied to various wireless communication systems in addition to the 3GPP LTE/LTE-A systems.

The invention claimed is:

1. A method for transmitting Channel State Information (CSI) by a user equipment (UE) in a wireless communication system that supports Multiuser Superposition Transmission (MUST), the method comprising:
reporting, to a base station, UE capability information related to a MUST operation;
reporting, to the base station, a first precoding matrix indicator (PMI) indicating a precoding matrix that is the most preferred by the UE, and a first channel quality indicator (CQI) that is calculated assuming use of the first PMI; and
reporting, to the base station, a second PMI indicating a precoding matrix that is secondly preferred by the UE, and a second CQI that is calculated assuming use of the second PMI.

2. The method of claim 1, wherein:
the first PMI and the first CQI are calculated assuming a rank indicator (RI) that is reported by the UE to the base station, and
the second PMI and the second CQI are calculated assuming the RI or a predefined RI.

3. The method of claim 2, wherein both the first PMI and the second PMI are selected from a codebook for beam selection and co-phasing.

4. The method of claim 1, wherein a periodicity and/or a granularity of the first PMI and the first CQI is identical to a periodicity and/or a granularity of the second PMI and the second CQI.

5. The method of claim 1, wherein the second CQI is reported as a differential CQI value relative to the first CQI.

6. The method of claim 1, wherein the second PMI indicates a precoding matrix that is selected from a subset of a codebook from which the first PMI is selected.

7. The method of claim 6, wherein the subset is composed of a precoding matrix that generates a beam of which correlation with a beam formed by the first PMI is equal to or greater than a preset threshold.

8. The method of claim 6, wherein the subset is composed of a precoding matrix which generates a beam orthogonal to a beam formed by the first PMI.

9. The method of claim 6, wherein the subset is composed of a precoding matrix which generates a beam having co-phasing identical to co-phasing of a beam formed by the first PMI.

10. The method of claim 6, wherein the subset is composed of a precoding matrix which generates a beam not orthogonal to the beam formed by the first PMI.

11. The method of claim 6, wherein the subset is composed of or a precoding matrix which generates a beam having other co-phasing except for co-phasing being orthogonal to the beam formed by the first PMI.

12. The method of claim 1, wherein a granularity of the second PMI and the second CQI is determined to be different from a granularity of the first PMI and the first CQI, or restricted only to a wideband.

13. The method of claim 1, wherein the first CQI and the second CQI are calculated using a power allocation factor that is used for the MUST transmission to the UE.

14. The method of claim 1, further comprising: reporting, to the base station, an absolute value of a variance of channel estimation error to correct the first CQI and the second CQI.

15. The method of claim 1, wherein the UE capability information may include at least one of the following: a UE-supportable MUST transmission technique; a number of Successive Interference Cancellation (SIC)-capable spatial layers; a receiver type, whether SIC is supported depending on a layer received by a UE; a number of superposed UEs per supportable layer; a total number of cancellation-capable superposed UEs; a total number of cancellation-capable spatial layers; whether MUST CSI reporting is supported; and a unit or number of blind detection (BD)-capable MUST power offsets.

16. A user equipment (UE) that transmits channel state information (CSI) in a wireless communication system supporting multiuser superposition transmission (MUST), the UE comprising:
a transmitter and a receiver; and
a processor operatively coupled to the transmitter and the receiver,
wherein the processor is configured to:
report, to a base station, UE capability information related to a MUST operation,
report, to the base station, a first precoding matrix indicator (PMI) indicating a precoding matrix that is the most preferred by the UE, and a first channel quality indicator (CQI) that is calculated assuming use of the first PMI; and
report, to the base station, a second PMI indicating a precoding matrix that is secondly preferred by the UE, and a second CQI that is calculated assuming use of the second PMI.

* * * * *